UNITED STATES PATENT OFFICE.

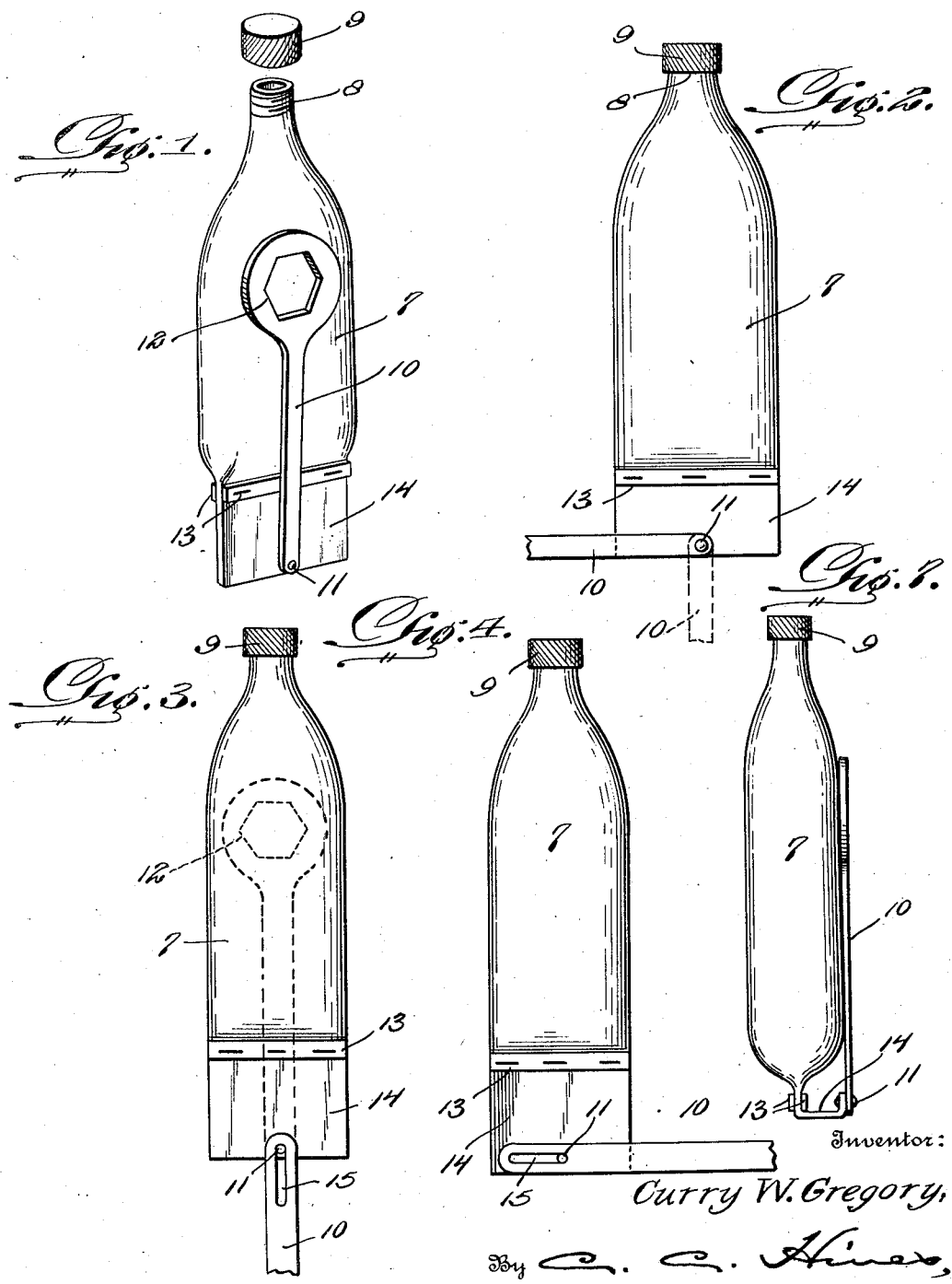

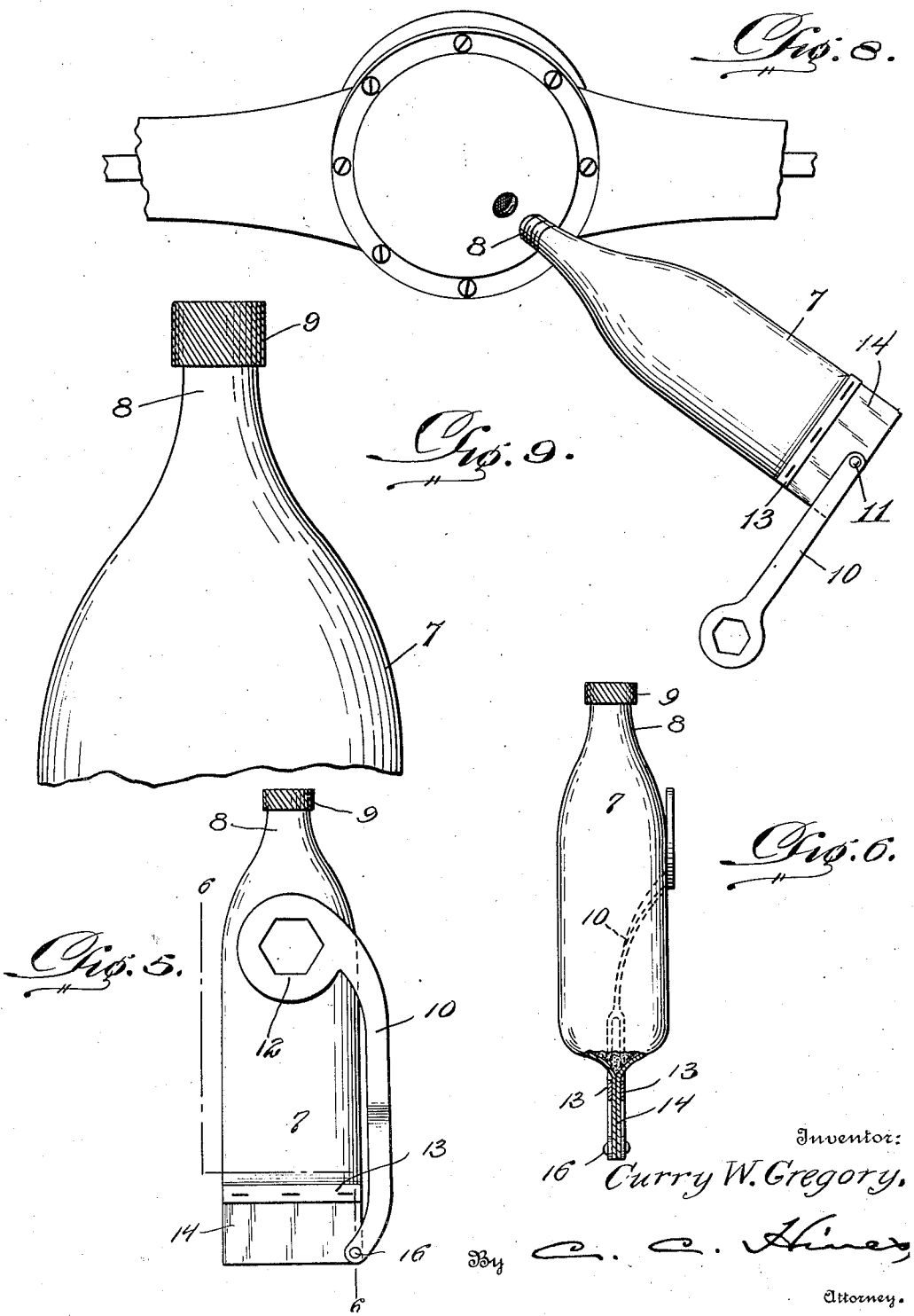

CURRY WILMER GREGORY, OF FREDERICK, MARYLAND.

OIL OR GREASE DISPENSING DEVICE.

1,407,997. Specification of Letters Patent. Patented Feb. 28, 1922.

Application filed May 11, 1921. Serial No. 468,551.

*To all whom it may concern:*

Be it known that I, CURRY W. GREGORY, a citizen of the United States, residing at Frederick, in the county of Frederick and State of Maryland, have invented new and useful Improvements in Oil or Grease Dispensing Devices, of which the following is a specification.

This invention relates to devices for holding and dispensing lubricating oils or greases into the differential gears of automobiles.

As is generally known to those familiar with motor vehicle construction, lubricant is usually introduced to the differential mechanism in the rear axle through an opening in the differential casing. This opening is ordinarily very small, being sealed by a screw cap, and the lubricant is inserted by the use of what is known as a grease gun. This lubricant is usually quite stiff, and it frequently happens that in loading the gun air pockets or bubbles occur therein so that the gun does not actually possess the quantity of lubricant which it is intended to contain and which the operator thinks is actually in the gun. When the nozzle of the gun is inserted in the filling opening of the differential housing and the plunger pressed, the contents of the gun is discharged into the differential mechanism, but by reason of the fact that the gun was not originally entirely full, the differential mechanism does not receive the quantity of lubricant intended or required.

Again, those familiar with the filling of grease cups and the application of lubricant to various parts of the mechanical structure of the machine realize the objectionable features in working with the lubricant. By reason of the stiffness of the grease, the grease cups and other parts of the machinery cannot be properly filled or lubricated without the operator using his hands either in assisting to fill the grease gun or in inserting the grease in the various parts to be lubricated, and it very frequently happens that the clothing of the operator becomes smeared with the grease.

It is the primary object of the invention to provide means whereby lubrication of parts such as those referred to may be effectually carried out without the use of the now generally employed grease gun, and wherein the operator may be assured that the part to be lubricated receives the desired or required quantity of lubricant.

A further object of the invention is to provide a device of the character and for the purposes stated which includes simple and improved means whereby the lubricant may be properly and conveniently packaged and readily dispensed, and wherein the packages containing the lubricant may be sold to the trade in convenient form and ready for instant use and used without the operator soiling the hands or clothing.

A still further object of the invention is to provide improvements in means for packaging the lubricant for quick and immediate use, which is featured by means of an improved nature for enabling all of the lubricating material to be discharged under pressure from the package and in which, should it not be desired to use all of the lubricant in one operation, the remaining amount of lubricant may be sealed within the package free from leakage in such manner that dust, grit, dirt, etc., can not gain access thereto, and yet which is ready for immediate use when occasion requires.

A still further object of the invention is to provide a lubricant dispensing device which combines therewith means performing a two-fold function, one of assisting in removing the grease cup top or filling opening cap or applying such elements thereto, and second of assisting materially in the lubricant dispensing operation.

With these and other objects in view, the invention consists of the features of construction, combination and arrangement of parts, hereinafter fully described and claimed, reference being had to the accompanying drawing, in which:—

Figure 1 is a perspective view of a lubricant dispensing device constructed in accordance with the invention, the view showing the device as it will appear in storage or during shipment, Figure 2 is a side elevation illustrating the operating shank swung to position to operate the lubricant container, the dotted line position showing a position which the shank may assume in operating upon a grease cup cap or filling opening of a gear housing, Figure 3 is a side elevation of a slightly modified form of the device, the shank being shown in inoperative position, Figure 4 is a fragmentary view illustrating the position the shank will assume preparatory to carrying out the lubricant dispensing operation, Figure 5 is a side elevation of a further modification, the shank being shown in inoperative position, Figure 6 is an edge view of the container, parts broken away, shown in Figure 5, Figure 7 is an edge view of the container shown in Figure 1 and showing a slight modification thereof, Figure 8 is a perspective view illustrating a portion of a differential housing, and showing the manner in which the compressible container is used in applying the lubricant to the differential mechanism, and Figure 9 is a fragmentary view showing the upper portion of a container constructed in accordance with the invention, the view disclosing the approximate size of one of the containers.

In carrying out the invention, the lubricant which ordinarily is comparatively heavy oil or grease, is contained within a collapsible tube indicated generally at 7. This tube may be of any desired size and is formed of lead foil or any other suitable ductile material such as is usually employed in the construction of collapsible containers, being provided at one end with a restricted neck portion or nozzle 8, closed by a cap 9. The nozzle will be of such size as to permit of the insertion of the same in ordinary grease cups or the filling openings of the various parts of the machinery to be lubricated.

Associated with the collapsible container is a wrench device for operating the same, which, in the present instance, includes a shank 10 preferably secured at one end as at 11 to the bottom end of the tube. This wrench device is pivoted to the lower edge of the container as shown, so as to be capable of swinging upwardly so as to lie close against the side of the container when not in use, and yet which may be swung outwardly at right angles to the tube when it is desired to dispense the lubricant. In one embodiment of the invention, the shank 10 is pivoted at the lower edge of the tube bottom intermediate the ends thereof, and it will be understood that when swung outwardly at right angles to the tube and parallel with the bottom thereof, the same may be twisted so as to roll or fold the lower portion of the tube, thus compressing the container and assisting in forcing the contents thereof from the nozzle 8. The dispensing operation may, however, if desired be carried out independently of the wrench 10, by merely squeezing the container in the hands.

The outer end of wrench 10 is preferably enlarged and rounded and provided with a squared opening 12 conforming to the size and shape of either the grease cup cap or the filling opening cap of the differential housing, and the wrench may therefore be used in removing such caps from their seats in advance of the filling operation and applying them thereto after filling has been carried out. In using the wrench for this purpose, the same may be swung upon its pivot 11 to a position most convenient for this operation.

In order that even pressure to all parts of the lower end of the tube 7 may be carried out in the dispensing operation, also to overcome the possibility of breakage of the tube or leakage of the contents thereof at the lower end, it is preferred that the tube be folded or rolled upon itself several times at the lower end before compression occurs in that part of the tube containing the lubricant. To this end, the tube is made somewhat longer than necessary for a given quantity of lubricant, and the tube is sealed inwardly from its lower end by passing a band or strip 13 transversely across the same. This strip may be of conventional type and may include a pair of such strips one positioned upon each side of the tube and crimped together so as to compress the tube tightly between them, thus forming a sealed bottom for the tube. The web portion 14 between the band or strip 13 and the lower end of the tube contains no lubricant, and such portion of the tube is to be folded or rolled upon the pivoted end of the wrench 10. It is preferred that the portion 14 be of such length as to permit of the same being folded or rolled upon itself two or three times, or, in fact, as many times as required to ensure that no leakage of the lubricant occurs at the lower end of the tube when compression of the filled portion thereof commences.

The web portion 14 may depend centrally from the tube 7, and the upwardly disposed wrench 10 may be shaped so as to lie flat and snug against the side of said container, however, in order to avoid any twisting or bending of the wrench 10, the portion 14 of the tube is extended laterally below the band 13 at right angles to the bore of the tube, and the free edge of the unfilled portion 14 is bent upwardly so that the straight wrench shank 10 will be positioned flush with the side of the tube 7. This enables the container or tube 7 and its associated wrench 10 to be conveniently packed for shippage or stored in comparatively small space, and yet the wrench may be swung to such operative position as desired.

In Figures 3 and 4 of the drawings there is shown a slightly modified form of the invention, wherein the wrench shank 10 is slotted as at 15 at its inner end so as to engage with the pivot 11 at the lower edge of the container. By so constructing the device, it is apparent that the wrench may be caused to lie snug against the side of the tube, and when operating the wrench to roll the portion 14 of the tube, the same is swung outwardly on pivot 11 until at right angles to the bore of the tube, whereupon it is slid inwardly upon pivot 11 until the outer edge of slot 15 is engaged by the said pivot, as shown in Figure 4. The shank portion 10 then lies transversely entirely across the lower edge of the container, and supports such edge throughout its length during the winding or rolling operation.

In the modified form shown in Figure 3 the shank 10 is pivoted as at 16 near one edge of the lower end of the tube. In this instance, the lower end of shank 10 is bifurcated so as to provide arms straddling the lower compressed edge of the tube, and the upper portion of shank 10 will be so formed as to dispose the headed upper end thereof snug against the side of the tube. The bifurcated lower end of shank 10 is of such length that when the shank is swung downwardly and across the lower end of the portion 14 of the tube, the extreme lower edge of the tube will be confined by the furcations of the shank. The said lower edge of the tube will thus be held firmly in proper rolling position between the furcations of the shank, whereupon the rolling action may effectively be carried out without danger of leakage.

In using the device, assuming that it is desired to introduce lubricant to the differential housing of the motor vehicle, the shank 10 is swung to such position as will enable the operator to conveniently apply the apertured end thereof to the cap closing the filling opening of the casing. The shank is then operated as an ordinary wrench to remove the closure cap. The closure member or cap of the tube is then removed, and after the shank 10 has been swung so as to be disposed transversely across the lower end of the tube, rolling or folding of the portion 14 of the tube is carried out by turning the shank 10 in the hands. As soon as the unfilled portion 14 has been firmly rolled upon the shank and the lower end of the filled portion of the tube is reached, further rolling will compress the tube sides and cause the lubricant to flow from the nozzle 8 thereof, it being understood that such nozzle has previously been inserted in the filling opening of the housing. Continued turning or rolling of the shank 10 further compresses the sides of the container and forces the contents of the latter into the housing. Should the tube 7 contain a quantity of lubricant greater than is desired or required to be introduced to the differential mechanism, the tube may be withdrawn and the cap 9 applied thereto, whereupon the partially filled tube may be put away in a tool kit or other convenient place for subsequent use. It is apparent that with a device constructed in accordance with the foregoing description, the application of the lubricating oil or grease to the various parts of the mechanism may be quickly and easily carried out without the necessity of soiling the hands or danger of staining the clothes with the oil or grease. Furthermore, by the use of such a device it is assured that the lubricant actually passes from the tube into the parts to be lubricated, as leakage past the rolled portion of the tube in the rolling or pressing operation is impossible. It will be understood, of course, that after the tube becomes empty it may be thrown away, and the cheapness with which the tube and wrench may be manufactured and assembled enables the devices to be supplied to the trade in neat and compact packages at reasonably low cost.

In collapsible containers heretofore proposed and used in packaging and dispensing plastic or semi-fluid substances, the head or top portions thereof are usually thickened and heavily reinforced, to such extent that it is impossible to compress the tube at such points as to eject all of the contents of the tube through the delivery neck. This objection is due, of course, to the reinforced head and neck construction, and in order to overcome such objection it will be noted that the upper or delivery end of the container is gradually contracted and is a true continuation of the container body. It is evident from this construction, therefore, that the tube may be rolled from the bottom entirely throughout its length, the neck being compressible throughout its extent. In this manner it is apparent that all of the lubricant contained within the tube may be ejected, and waste is thereby avoided.

While the above is a description of the invention in its preferred embodiment, it is to be understood that the invention is not necessarily limited to the precise structure and details set forth, as variations in the construction and arrangement of the parts may be resorted to if desired without departing from the invention as claimed.

Having thus fully described my invention, I claim:

1. In a dispensing device of the character described, a compressible container, a compression device connected thereto and adapted to be swung thereon to a number of positions, the said device adapted when in one position to assist in compressing the said container.

2. In a dispensing device of the character described, a compressible container, a compression device pivoted thereto and capable of swinging to a number of positions, and said device adapted when in one position to roll the said container thereon whereby the said container may be compressed.

3. In a dispensing device of the character described, a compressible tube, a compression device pivoted at one end to the lower end of said tube, and a cap manipulating means on said device.

4. In a dispensing device of the character described, a collapsible tube, a compression device having a shank pivoted to one end of said tube and adapted when in one position to lie snug against the side of the latter, said device when swung to another position adapted to roll the tube on the shank thereof.

5. In a dispensing device of the character described, a collapsible tube, a flat unfilled portion at the lower end of said tube, a compression device comprising a shank pivoted at one end to the lower extremity of said unfilled portion, and the said shank being capable of swinging to a number of angular positions with respect to said tube.

6. In a dispensing device of the character specified, a tube having compressible walls, a compression device for said tube, the said device being pivoted at one end to the lower end of said tube so as to be capable of assuming a number of angular positions with respect to the tube, and a slip-joint connection between the device and the tube whereby adjustment of the device longitudinally thereof may be made upon the tube.

7. In a dispensing device of the character described, a collapsible tube, a compression device for said tube, said device being pivoted at one end to the lower end of said tube near one edge thereof and capable of swinging to various angular positions with respect to said tube, the said device when in one position adapted to lie snug against a side of said tube.

In testimony whereof I affix my signature.

CURRY WILMER GREGORY.